3,344,133
WATER-DISPERSIBLE MONOAZO DYESTUFFS
Werner Bossard, Riehen, and Francois Favre, Basel, Switzerland, assignors to J. R. Geigy A.G., Basel, Switzerland
No Drawing. Continuation of application Ser. No. 136,163, Sept. 6, 1961. This application Sept. 20, 1963, Ser. No. 310,456
Claims priority, application Switzerland, Sept. 11, 1959, 78,083/59; Feb. 28, 1961, 2,399/61
7 Claims. (Cl. 260—163)

This application is a continuation of our copending application Ser. No. 136,163, filed on Sept. 6, 1961 as a continuation-in-part of our application Ser. No. 54,362, filed on Sept. 7, 1960, both now abandoned.

The invention concerns new, difficultly water soluble monoazo dyestuffs which are dispersible in water, processes for the production thereof, dyeing processes using the new dyestuffs and, as industrial product, the material dyed by the aid of these dyestuffs.

It has been found that new, valuable monoazo dyestuffs which are difficultly soluble in water are obtained by reacting an isocyclic diazonium compound with a 5-aminopyrazole coupling in the 4-position, the components being so chosen that the dyestuff contains neither water solubilizing groups which dissociate acid in water nor an aromatically bound hydroxyl group.

As isocyclic diazonium compounds, those of the naphthalene and, preferably, of the benzene series are used.

As defined, the diazo components should not contain any sulfonic acid, carboxylic acid groups or aromatically bound hydroxyl groups. The isocyclic radicals thereof can otherwise be substituted as desired, for example by hydrocarbon groups such as methyl, ethyl, isopropyl, tert. butyl, tert. amyl, cyclohexyl phenyl, benzyl groups; by ether groups such as methoxy, ethoxy, 2-hydroxyethoxy, phenoxy, cresoxy, chlorophenoxy, phenylthio, p-chlorophenylthio groups; by acylamino groups such as the acetylamino, chloroacetylamino, β-chloropropionylamino, methylsulfonylamino, chloromethylsulfonylamino, benzoylamino, chlorobenzoylamino groups; by amino groups such as dimethylamino, diethylamino, bis-cyanoethylamino, phenylalkylamino groups, in particular, however, by electrophilic substituents such as the nitro group, the cyano group, the halogens fluorine, chlorine and bromine, the keto group, the sulphonyl group such as the methyl- or ethylsulfonyl butylsulfonyl, phenylsulfonyl, toluylsulfonyl, xylylsulfonyl, chlorophenysulfonyl, fluorosulfonyl groups, by sulfonic acid amide groups such as the sulfonic acid dimethylamide, diethylamide, dibutylamide, cyclohexylamide, phenylalkylamide, piperidide and morpholide groups.

The coupling components used according to the invention correspond to the tautomeric Formulas I and II

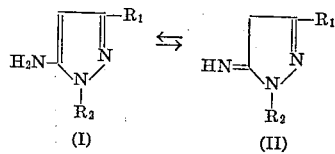

wherein:

$R_1$ represents a lower alkyl group and advantageously the methyl group, or secondly, it represents a phenyl group which can be further substituted,
$R_2$ represents hydrogen or an organic radical in which case it is advantageously a phenyl group further substituted, or it is a low, possibly substituted alkyl group, an aralkyl group, in particular the benzyl, a phenylalkyl or phenyl-hydroxyalkyl group, or a cycloalkyl group, in particular a cyclohexyl or methylcyclohexyl group.

Nucleophilic substituents are preferred as non-ionogenic substituents of phenyl radicals of the coupling components, for example, low alkyl groups, low molecular alkylether or phenyl ether groups, acylamino groups such as the acetylamino, the methylsulphonylamino group.

The coupling is performed advantageously in an acid medium, in particular in a mineral acid to weakly acid aqueous solution, possibly while gradually buffering the mineral acid, for example, with alkali metal salts of low fatty acids.

Monoazo dyestuffs which are free from sulphonic acid, carboxylic acid and aromatically bound hydroxyl groups are the subject, therefore, of the present application. These dyestuffs correspond to the general formula

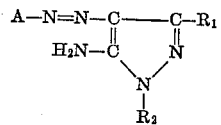

wherein:

A represents at most bicyclic carbocyclic aryl radical,
$R_1$ represents a member selected from the group consisting of lower alkyl and phenyl radicals,
$R_2$ represents a member selected from the group consisting of hydrogen, aliphatic, cycloaliphatic, phenyl-lower alkyl, phenyl-lower hydroxyalkyl, and mononuclear carbocyclic aryl radicals.

Dyestuffs in which A is a monocyclic aryl radical which advantageously has the electrophilic substituents below-mentioned, are preferred. As substituents of the benzene nucleus A come into consideration especially lower alkyl, e.g. methyl, lower alkoxy, carboalkoxy e.g. carboethoxy, acetyl, benzoyl groups and advantageously halogen, e.g. chlorine and bromine, nitro, cyano and sulfonyl groups such as lower alkyl sulfonyl and lower alkyl aryl sulfonyl groups and sulfonic acid amide groups, e.g. —$SO_2NH_2$, —$SO_2NH$-lower alkyl, —$SO_2NH$-lower hydroxyalkyl,

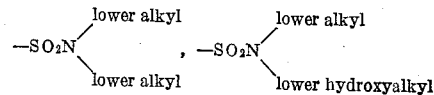

and

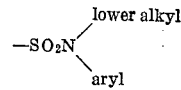

In the above formula $R_1$ is preferably the methyl group.

Preferred aliphatic radicals as $R_2$ are lower alkyl radicals which can be substituted by the hydroxy or cyano group. If $R_2$ is a cycloaliphatic radical, then it is advantageously the cyclohexyl or methyl cyclohexyl group. If $R_2$ is a phenyl-lower alkyl radical, then it is advantageously the benzyl or α-phenylethyl group. If $R_2$ is a phenyl-lower hydroxyalkyl radical, then it is advantageously the β-hydroxy-β-phenyl-ethyl group. If $R_2$ is a mononuclear aryl radical, then it is advantageously an unsubstituted phenyl radical or a phenyl radical substituted by lower alkyl e.g. methyl, lower alkoxy, halogen e.g. chlorine and bromine, phenoxy, amino, acylamino, lower alkylsulphonyl or sulphonic acid amide groups, e.g. —$SO_2NH_2$, —$SO_2NH$-lower alkyl, —$SO_2NH$-lower hydroxyalkyl,

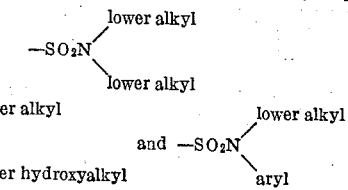

A particularly valuable class of compounds according to the invention corresponds to the formula

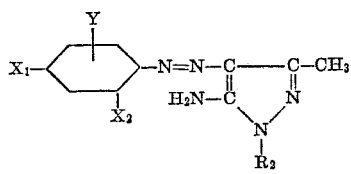

wherein:

Of $X_1$ and $X_2$, one X stands for the nitro group and the other for an electrophilic substituent, in particular halogen, nitro, cyano or sulphonyl groups such as alkyl and aryl sulphonyl groups and sulphonic acid amide groups, Y represents hydrogen, chlorine, bromine or methyl, and $R_2$ has the meaning given above.

The dyestuffs according to the invention are suitable for the dyeing of hydrophobic synthetic textile fibres from aqueous dispersion, for example for the dyeing of cellulose acetate and cellulose triacetate and especially of high molecular esters of aromatic polycarboxylic acids with polyfunctional alcohols, in particular for the dyeing of high molecular glycol terephthalates at high dyeing temperatures. They can also be used, however, for the dyeing of polyamide fibres such as nylon and of "Perlon."

The dyeing of hydrophobic textile fibres in aqueous dispersion of the dyestuffs according to the invention is performed advantageously at temperatures of over 100° C. under pressure. On dyeing at the boiling point of the water, the presence of colour carriers in the dyebath is recommended, for example, the presence of phenylphenol or of other known similar phenolic carriers.

The dyestuffs according to the invention are distinguished by a surprisingly good affinity to hydrophobic polyester fibres, in particular to polyglycol terephthalates and, depending on their composition, they produce on these fibres yellow, orange to red dyeings which have good fastness to wet, sublimation and light.

The following examples illustrate the invention. Where not otherwise stated, parts are given as parts by weight. The temperatures are in degrees centigrade. The relationship of parts by weight to parts by volume is as that of grammes to cubic centimetres.

*Example 1*

18.3 parts of 1-amino-2,4-dinitrobenzene in 30 parts of concentrated sulphuric acid are diazotised for 10 hours at 15° in the usual way with nitrosyl sulphuric acid, corresponding to 6.9 parts of sodium nitrite. The diazonium salt soluton so obtained is added dropwise at 5° to a solution of 14.9 parts of 1-isopropyl-3-methyl-5-aminopyrazole in 300 parts of glacial acetic acid and 500 parts of water.

The reaction mixture is buffered by the addition of sodium acetate until the reaction is weakly acid to Congo red paper whereupon it is stirred for 2 hours at room temperature.

The dyestuff formed is filtered off under suction, washed neutral with diluted sodium carbonate solution and dried at 60°. It precipitatess in the form of an orange-red powder which, when milled with alkyl benzene sulphonate, dyes polyester fibres, possibly in the presence of colour carriers such as o-phenylphenol, in orange-red shades. The dyeings have excellent fastness to light and migration.

If in the above example, equimolecular parts of the diazo components given in the following Table I are used instead of the 18.3 parts of 1-amino-2,4-dinitrobenzene and the coupling components given are added thereto under the same conditions, then dyestuffs are obtained which produce dyeings on polyester fibres having similar good properties.

TABLE I

| No. | Diazo component | Coupling component | Shade on polyster fibre |
|---|---|---|---|
| 1 | 1-amino-4-nitrobenzene | 1-isopropyl-3-methyl-5-aminopyrazole | Yellow-Orange. |
| 2 | ----do---- | 1-(β-hydroxyethyl)-3-methyl-5-aminopyrazole | Do. |
| 3 | ----do---- | 1,3-dimethyl-5-aminopyrazole | Do. |
| 4 | ----do---- | 1-methyl-3-phenyl-5-aminopyrazole | Do. |
| 5 | ----do---- | 1-ethyl-3-methyl-5-aminopyrazole | Do. |
| 6 | 1-amino-6-methyl-2,4-dinitrobenzene | 1-(6'-methyl-cyclohexyl)-3-methyl-5-aminopyrazole | Reddish orange. |
| 7 | 1-amino-2-chloro-4-nitrobenzene | 1-isopropyl-3-methyl-5-aminopyrazole | Orange. |
| 8 | ----do---- | 1-(β-cyanoethyl)-3-methyl-5-aminopyrazole | Red-orange. |
| 9 | ----do---- | 1-(α-phenylethyl)-3-methyl-5-aminopyrazole | Orange. |
| 10 | ----do---- | 1-methyl-3-phenyl-5-amino-pyrazole | Do. |
| 11 | ----do---- | 1,3-dimethyl-5-aminopyrazole | Do. |
| 12 | 1-amino-2,6-dichloro-4-nitrobenzene | 1-isopropyl-3-methyl-5-aminopyrazole | Yellow-orange. |
| 13 | ----do---- | 1-(β-hydroxyethyl)-3-methyl-5-aminopyrazole | Do. |
| 14 | ----do---- | 1-(β-cyanoethyl)-3-methyl-5-aminopyrazole | Red-orange. |
| 15 | ----do---- | 1-methyl-3-phenyl-5-aminopyrazole | Orange. |
| 16 | ----do---- | 1-ethyl-3-methyl-5-aminopyrazole | Do. |
| 17 | 1-amino-4-phenyl-sulfonyl-2-nitrobenzene | 1-isopropyl-3-methyl-4-amino-pyrazole | Do. |
| 18 | ----do---- | 1-(β-cyanoethyl)-3-methyl-5-aminopyrazole | Do. |
| 19 | ----do---- | 1,3-dimethyl-5-aminopyrazole | Do. |
| 20 | ----do---- | 1-methyl-3-phenyl-5-aminopyrazole | Do. |
| 21 | ----do---- | 1-ethyl-3-methyl-5-aminopyrazole | Do. |
| 22 | 1-amino-4-benzoylbenzene | 1-isopropyl-3-methyl-5-aminopyrazole | Yellow-orange. |
| 23 | 1-amino-2-cyano-4-nitrobenzene | 1-cyclohexyl-3-methyl-5-amino-pyrazole | Orange-red. |
| 24/25 | ----do---- | 1,3-dimethyl-5-aminopyrazole | Do. |
| 26 | ----do---- | 1-ethyl-3-methyl-5-aminopyrazole | Do. |
| 27 | ----do---- | 1-(β-hydroxyethyl)-3-methyl-5-aminopyrazole | Do. |
| 28 | 1-amino-2-nitrobenzene-4-sulfonic acid-N-methyl-N-phenylamide. | 1-cyclohexyl-3-methyl-5-aminopyrazole | Orange. |
| 29 | ----do---- | 1,3-dimethyl-5-aminopyrazole | Do. |
| 30 | ----do---- | 1-(β-hydroxyethyl)-3-methyl-5-aminopyrazole | Do. |
| 31 | ----do---- | 1-ethyl-3-methyl-5-aminopyrazole | Do. |
| 32 | ----do---- | 1-(α-phenylethyl)-3-methyl-5-aminopyrazole | Do. |
| 33/34 | 1-amino-2,5-dimethoxy-4-nitrobenzene | 1-isobutyl-3-methyl-5-aminopyrazole | Yellow. |
| 35/36 | ----do---- | 1-ethyl-3-methyl-5-aminopyrazole | Do. |
| 37/38 | ----do---- | 1-isopropyl-3-methyl-5-aminopyrazole | Do. |
| 39/40 | ----do---- | 1-(β-hydroxyethyl)-3-methyl-5-aminopyrazole | Do. |
| 41/42 | ----do---- | 1-(α-phenylethyl)-3-methyl-5-aminopyrazole | Do. |
| 43 | 1-amino-2,4-dinitrobenzene | 1-isobutyl-3-methyl-5-aminopyrazole | Red-orange. |
| 44 | ----do---- | 1-cyclohexyl-3-methyl-5-aminopyrazole | Do. |
| 45 | ----do---- | 1-(1,2-dimethyl-n-propyl)-3-methyl-5-aminopyrazole. | Do. |
| 46 | ----do---- | 1-benzyl-3-methyl-5-aminopyrazole | Orange. |
| 47 | 1-amino-2-nitro-4-methylsulfonyl benzene | 1-benzyl-3-methyl-5-aminopyrazole | Yellowish-orange. |
| 48 | 1-amino-2,4-dinitrobenzene | 1-(4'-methyl-cyclohexyl)-3-methyl-5-aminopyrazole. | Orange. |

Example 2

A fine suspension of 13.8 parts of 1-amino-4-nitrobenzene in 220 parts of water and 26 parts of 36% hydrochloric acid is diazotised at 5° to 7° in the usual way by the addition of 6.9 parts of sodium nitrite.

The clear diazo solution is added dropwise to a solution of 16.1 parts of 1-phenyl-3-methyl-5-aminopyrazole in 300 parts of glacial acetic acid and 500 parts of water. After 1 hour, the reaction mass is buffered with sodium acetate to a pH of 4 to 4.5.

The precipitated dyestuff is filtered off, washed neutral with sodium carbonate solution and dried at 55° to 60°. It is a red-orange powder and it dyes polyester fibers, after milling with alkylarylbenzene sulphonate and possible with the addition of colour carriers, from aqueous dispersion in yellow-orange shades. The dyeings have very good fastness to light, perspiration and migration.

If in the above example instead of the 13.8 parts of 1-amino-4-nitrobenzene, a corresponding amount of the diazo components given in the following Table II are used and the coupling components given are added thereto under the same conditions, then dyestuffs are obtained which produce dyeings on polyester fibres which have equally good properties.

TABLE II

| No. | Diazo component | Coupling component | Shade on polyester fiber |
|---|---|---|---|
| 1 | 1-amino-2,4-dinitrobenzene | 1-phenyl-3-methyl-5-aminopyrazole | Orange-scarlet. |
| 2 | do | 1-(4'-methylphenyl)-3-methyl-5-aminopyrazole | Orange. |
| 3 | do | 1,3-diphenyl-5-aminopyrazole | Do. |
| 4 | 1-amino-2-methoxy-4-nitrobenzene | 1-phenyl-3-methyl-5-aminopyrazole | Red-orange. |
| 5 | do | 1-(4'-acetylaminophenyl)-3-methyl-5-aminopyrazole | Do. |
| 6 | do | 1-(2',4'-dimethylphenyl)-3-methyl-5-aminopyrazole | Do. |
| 7/8 | do | 1-(3'-methoxyphenyl)-3-methyl-5-aminopyrazole | Do. |
| 9 | do | 1-(2'-methylphenyl)-3-methyl-5-aminopyrazole | Do. |
| 10 | 1-amino-2,5-dichlorobenzene | 1-phenyl-3-methyl-5-aminopyrazole | Yellow. |
| 11 | do | 1-(4'-aminophenyl)-3-methyl-5-aminopyrazole | Do. |
| 12 | do | 1-(3'-methoxyphenyl)-3-methyl-5-aminopyrazole | Do. |
| 13 | 1-amino-4-methylsulfonyl-2-nitrobenzene | 1-phenyl-3-methyl-5-aminopyrazole | Orange. |
| 14 | do | 1-(4'-ethoxyphenyl)-3-methyl-5-aminopyrazole | Do. |
| 15 | do | 1,3-diphenyl-5-aminopyrazole | Do. |
| 16 | 1-amino-4-phenylsulphonyl-2-nitrobenzene | 1-phenyl-3-methyl-5-aminopyrazole | Do. |
| 17 | do | 1-(2'-methylphenyl)-3-methyl-5-aminopyrazole | Do. |
| 18 | do | 1-(2'-methoxy-5'-methylphenyl)-3-methyl-5-aminopyrazole | Do. |
| 19 | 1-amino-4-methylsulphonylbenzene | 1-phenyl-3-methyl-5-aminopyrazole | Yellow-orange. |
| 20 | do | 1-(4'-methylphenyl)-3-methyl-5-aminopyrazole | Do. |
| 21 | do | 1-(3'-methoxyphenyl)-3-methyl-5-aminopyrazole | Do. |
| 22 | 1-amino-6-chloro-2,4-dinitrobenzene | 1-phenyl-3-methyl-5-aminopyrazole | Orange. |
| 23 | do | 1-(4'-methylphenyl)-3-methyl-5-aminopyrazole | Do. |
| 24 | do | 1-(3'-methoxyphenyl)-3-methyl-5-aminopyrazole | Do. |
| 25 | 1-amino-6-bromo-2,4-dinitrobenzene | 1-phenyl-3-methyl-5-aminopyrazole | Do. |
| 26 | do | 1-(2'-methylphenyl)-3-methyl-5-aminopyrazole | Do. |
| 27 | do | 1-(4'-methoxyphenyl)-3-methyl-5-aminopyrazole | Do. |
| 28 | 1-amino-2,5-dichloro-4-nitrobenzene | 1-phenyl-3-methyl-5-aminopyrazole | Do. |
| 29 | do | 1-(2',6'-dimethylphenyl)-3-methyl-5-amino pyrazole | Do. |
| 30 | do | 1-(4'-ethoxyphenyl)-3-methyl-5-aminopyrazole | Do. |
| 31 | 1-amino-2-cyano-4-nitrobenzene | 1-phenyl-3-methyl-5-aminopyrazole | Red-orange. |
| 32 | do | 1-(2'-methylphenyl)-3-methyl-5-aminopyrazole | Do. |
| 33 | do | 1-(4'-methylphenyl)-3-methyl-5-aminopyrazole | Do. |
| 34 | 1-amino-4-carboethoxybenzene | 1-phenyl-3-methyl-5-aminopyrazole | Yellow. |
| 35 | do | 1-(4'-methoxyphenyl)-3-methyl-5-aminopyrazole | Do. |
| 36 | do | 1-(2'-methylphenyl)-3-methyl-5-aminopyrazole | Do. |
| 37 | 1-amino-2-carboethoxy-4-nitrobenzene | 1-phenyl-3-methyl-5-aminopyrazole | Orange. |
| 38 | do | 1-(2'-methylphenyl)-3-methyl-5-aminopyrazole | Do. |
| 39 | 1-amino-2,4-dinitrobenzene | 1-phenyl-3-ethyl-5-aminopyrazole | Reddish orange. |
| 40 | 1-amino-2-nitro-4-methylsulphonylbenzene | 1-phenyl-3-ethyl-5-aminopyrazole | Yellowish orange. |
| 41 | 1-amino-2-nitro-4-methylsulphonylbenzene | 1-phenyl-3-n-propyl-5-aminopyrazole | Do. |
| 42 | 1-amino-6-methyl-2,4-dinitrobenzene | 1-phenyl-3-methyl-5-aminopyrazole | Orange. |
| 43 | 1-amino-2,4-dinitrobenzene | 1-(4'-ethoxyphenyl)-3-methyl-5-aminopyrazole | Reddish orange. |
| 44 | 1-amino-2-nitro-4-ethylsulphonylbenzene | 1-phenyl-3-methyl-5-aminopyrazole | Do. |
| 45 | 1-amino-2-chloro-4-nitrobenzene | 1-(4'-chlorophenyl)-3-methyl-5-aminopyrazole | Do. |
| 46 | 1-amino-2-chloro-4-nitrobenzene | 1-(2'-chloro-6'-methylphenyl)-3-methyl-5-aminopyrazole | Do. |
| 47 | do | 1-(2',4'-dichlorophenyl)-3-methyl-5-aminopyrazole | Do. |
| 48 | 1-amino-2,6-dichloro-4-nitrobenzene | 1-(3',4'-dichlorophenyl)-3-methyl-5-aminopyrazole | Do. |
| 49 | do | 1-(3'-sulphamidophenyl)-3-methyl-5-aminopyrazole | Do. |
| 50 | do | 1-(4'-sulphamidophenyl)-3-methyl-5-aminopyrazole | Do. |
| 51 | do | 1-(3'-N-methylsylphamidophenyl)-3-methyl-5-aminopyrazole | Do. |
| 52 | do | 1-(3'-N-dimethylsulphamidophenyl)-3-methyl-5-aminopyrazole | Do. |
| 53 | 1-amino-4-nitrobenzene | 1-(3'-N-diethylsulphamidophenyl)-3-methyl-5-aminopyrazole | Red orange. |
| 54 | do | 1-(3'-N-ethylsulphamidophenyl)-3-methyl-5-aminopyrazole | Do. |
| 55 | 1-amino-2,4-dinitrobenzene | 1-(4'-phenoxyphenyl)-3-methyl-5-aminopyrazole | Do. |
| 56 | 1-amino-2-chloro-4-nitrobenzene | 1-(4'-phenyoxyphenyl)-3-methyl-5-aminopyrazole | Yellow orange. |
| 57 | 1-amino-2,6-dichloro-4-nitrobenzene | 1-(3'-N-β-hydroxyethylsulphamidophenyl)-3-5-aminopyrazole | Do. |
| 58 | 1-amino-2,4-dinitrobenzene | do | Do. |
| 59 | 1-amino-4-benzoylbenzene | | Do. |
| 60 | 1-amino-2,4-dinitrobenzene | 1-phenyl-3-methyl-5-aminopyrazole | Do. |
| 61 | 1-amino-4-nitrobenzene | 1-(4'-aminophenyl)-3-methyl-5-aminopyrazole | Red orange. |
| 62 | 1-amino-2-nitro-4-ethylsulfonylbenzene | 1-(4'-bromophenyl)-3-methyl-5-aminopyrazole | Orange. |
| 63 | do | do | Yellowish red. |
| 64 | do | 1-(3',4'-dichlorophenyl)-3-methyl-5-aminopyrazole | Yellow red. |
| 65 | 1-amino-2-nitro-4-N-methylsulphamidobenzene | 1-isopropyl-3-methyl-5-aminopyrazole | Do. |
| 66 | 1-amino-2-nitro-4-N-ethylsulphamidophenyl | 1-(4'-ethoxyphenyl)-3-methyl-5-aminopyrazole | Do. |
| 67 | 1-amino-2-nitro-4-sulphamidobenzene | 1-(4'-chlorophenyl)-3-methyl-5-aminopyrazole | Do. |
| 68 | do | 1-phenyl-3-methyl-5-aminopyrazole | Do. |
| 69 | 1-amino-2-nitro-4-N-diethylsulphamidobenzene | 1-isopropyl-3-methyl-5-aminopyrazole | Do. |
| 70 | 1-amino-2-nitro-4-N-dimethylsulphamidobenzene | 1-(4'-chlorophenyl)-3-methyl-5-aminopyrazole | Do. |
| 71 | 1-amino-2-nitro-4-diethylmethyl-N-β-hydroxyethylsulphamidobenzene | 1-(4'-ethoxyphenyl)-3-methyl-5-aminopyrazole | Do. |
| 72 | 1-amino-2-nitro-4-N-methyl-N-phenylsulphamidobenzene | 1-phenyl-3-methyl-5-aminopyrazole | Do. |

TABLE II—Continued

| No. | Diazo component | Coupling component | Shade on polyester fiber |
|---|---|---|---|
| 73 | 1-amino-2,4-dinitrobenzene | 1-(4'-methylsulphonylphenyl)-3-methyl-5-aminopyrazole. | Reddish orange. |
| 74 | do | 1-(3'-methylsulphonyl-6-methylphenyl)-3-methyl-5-aminopyrazole. | Do. |
| 75 | 1-amino-2,4-dinitrobenzene | 1-(4'-ethylsulphonylphenyl)-3-methyl-5-aminopyrazole. | Do. |
| 76 | 1-amino-2-nitro-4-acetylbenzene | 1-phenyl-3-methyl-5-aminopyrazole | Do. |
| 77 | do | 1-isopropyl-3-methyl-5-aminopyrazole | Do. |
| 78 | 1-amino-2-chloro-4-nitrobenzene | 1-(4'-isopropylsulphonylphenyl)-3-methyl-5-aminopyrazole. | Orange. |
| 79 | 1-amino-2,6-dichloro-4-nitrobenzene | 1-(4'-n-butylsulphonylphenyl)-3-methyl-5-aminopyrazole. | Do. |
| 80 | do | 1-(4'-N-isopropylsulphamidophenyl)-3-methyl-5-aminopyrazole. | Yellow orange. |
| 81 | do | 1-(4'-N-di-isopropylsulphamidophenyl)-3-methyl-5-aminopyrazole. | Do. |
| 82 | do | 1-(4'-N-ethylphenylsulphamidophenyl)-3-methyl-5-aminopyrazole. | Do. |
| 83 | do | 1-(3'-N-methyl-N-β-hydroxyethylsulphamidophenyl)-3-methyl-5-aminopyrazole. | Do. |
| 84 | 1-amino-2,5-diethoxy-4-nitrobenzene | 1-phenyl-3-methyl-5-aminopyrazole | Reddish orange. |
| 85 | do | 1-isopropyl-3-methyl-5-aminopyrazole | Do. |
| 86 | 1-amino-2-nitrobenzene-4-sulphonic acid-N-isopropylamide. | do | Yellowish orange. |
| 87 | 1-amino-2-nitrobenzene-4-sulphonic acid-N-di-isopropylamide. | do | Do. |
| 88 | 1-amino-2-nitrobenzene-4-sulphonic acid-N-n-butylamide. | 1-isopropyl-3-methyl-5-aminopyrazole | Do. |
| 89 | 1-amino-2-nitrobenzene-4-sulphonic acid-N-ethyl-N-phenylamide. | 1-(4'-chlorophenyl)-3-methyl-5-aminopyrazole | Do. |
| 90 | 1-amino-2-nitrobenzene-4-sulphonic acid-N-β-hydroxyethylamide. | do | Do. |

*Example 3*

Nitrosyl sulphuric acid, corresponding to 6.9 parts of sodium nitrite, is added to 20.7 parts of 1-amino-2,6-dichloro-4-nitrobenzene in 40 parts of concentrated sulphuric acid, and diazotising is performed within 1½ hours at 20–25°. The diazonium salt solution, which has possibly been clarified, is poured into a cooled solution of 9.6 parts of 3-methyl-5-aminopyrazole in dilute hydrochloric acid and the reaction mass is brought to a pH of 4 to 4.5 by the addition of sodium acetate. The precipitated dyestuff is filtered off, washed neutral with dilute sodium carbonate solution and water and dried at 60°. A scarlet powder is obtained which is milled with fatty alcohol sulphonate and which dyes polyester fibres from aqueous dispersion in vidid orange shades. The dyeings are distinguished by good fastness properties.

If in the above example, instead of the 20.7 parts of 1-amino-2,6-dichloro-4-nitrobenzene, equimolar amounts of the diazo components given in the following Table III are used and they are coupled under the same conditions with the same amount of 3-methyl-5-aminopyrazole, then dyestuffs are obtained which produce dyeings having similar good properties on polyester fibres.

TABLE III

| No. | Diazo component | Coupling component | Shade on polyester fiber |
|---|---|---|---|
| 1 | 1-amino-4-nitrobenzene | 3-methyl-5-aminopyrazole. | Orange. |
| 2 | 1-amino-2-chloro-4-nitrobenzene | do | Do. |
| 3 | 1-amino-2,4-dinitrobenzene | do | Do. |
| 4 | 1-amino-2,5-dichlorobenzene | do | Do. |
| 5 | 1-amino-4-methylsulphonylbenzene | do | Do. |
| 6 | 1-amino-4-phenylsulphonylbenzene | do | Do. |
| 7 | 1-amino-2,4-dicyanobenzene | do | Do. |

*Example 4*

18.3 parts of 1-amino-2,4-dinitrobenzene are dissolved in 30 parts of concentrated sulphuric acid and diazotised at 15° for 10 hours with nitrosyl sulphuric acid, corresponding to 6.9 parts of sodium nitrite. The solution of the diazonium compound is added dropwise at 5° to a solution of 21.7 parts of 1(β-hydroxy-β-phenylethyl)-3-methyl-5-aminopyrazole in 400 parts of glacial acetic acid and 600 parts of water. The mixture is buffered with sodium acetate until the reaction is weakly acid to Congo paper. The precipitated dyestuff is filtered off, washed with water and dried at 60°. In this way, a red powder is obtained which, when milled with a synthetic dispersing agent, dyes polyester fibres such as "Dacron" from aqueous dispersion with the addition of swelling agents in vivid orange shades. The dyeings are distinguished by very good fastness to light and migration.

The coupling component used in the above example can be obtained by reacting styrene oxide with hydrazine in molar ratio of about 1:1 and then condensing the β-hydroxy-β-phenyl-ethyl hydrazine obtained with cyanoacetone imine.

*Example 5*

23 parts of 1-amino-2-nitro-4-ethylsulfonylbenzene in 40 parts of 80% sulphuric acid are diazotised for 10 hours at 15° with nitrosyl sulphuric acid corresponding to 6.9 parts of sodium nitrite.

The solution of the diazonium compound is added dropwise at 5° to a solution of 21.7 parts of 1-(β-hydroxy-β-phenylethyl)-3-methyl-5-aminopyrazole in 400 parts of glacial acetic acid and 600 parts of water. The reaction mixture is then buffered with sodium acetate to a pH of 4–4.5.

The red-orange dyestuff which precipitates is filtered off, washed with water and dried at 60°.

After milling with an alkali alkyl-arylbenzene sulphonate, it dyes polyester fibers in yellow-orange shades. The dyeings have excellent fastness to sublimation.

If in the above example, instead of 21.7 parts of 1-(β - hydroxy - β-phenylethyl)-3-methyl-5-aminopyrazole, 23.1 parts of 1-(β - hydroxy-β-phenylethyl)-3-ethyl-5-aminopyrazole or 27.9 parts of 1-(β-hydroxy-β-phenylethyl)-3-phenyl-5-aminopyrazole are used as coupling component, then dyestuffs having similar properties are obtained.

*Example 6*

13.8 parts of 1-amino-4-nitrobenzene are suspended in 190 parts of water and 26 parts of 36% hydrochloric acid and diazotised by the addition of 5–7° of 6.9 parts of sodium nitrite.

The clear solution of the diazonium compound is added dropwise while stirring to a solution of 21.7 parts of 1 - (β - hydroxy-β-phenylethyl)-3-methyl-5-aminopyrazole in 350 parts of glacial acetic acid and 500 parts of water. After 1½ hours, the pH of the reaction mixture is adjusted to 4 with sodium acetate.

The precipitated dyestuff is filtered off, washed neutral with water and dried at 55–60°. It is a red-orange powder. When milled with an alkali alkyl-arylbenzene sulphonate it dyes polyester fibers from aqueous dispersion, possibly with the addition of swelling agents, in orange shades. The dyeings have very good fastness to light and migration.

If in the above examples, instead of 1-amino-4-nitrobenzene, 17.25 parts of 1-amino-2-chloro-4-nitrobenzene are used, then a dyestuff having similar properties is obtained.

*Example 7*

21.7 parts of 1-amino-2-nitrobenzene-4-sulphonic acid amide are diazotised in the usual way for 10 hours at 15° in 30 parts of concentrated sulphuric acid with nitrosyl sulphuric acid, corresponding to 6.9 parts of sodium nitrite. The solution of the diazonium compound obtained is added dropwise at 50° while stirring to a solution of 21.7 parts of 1-(β-hydroxy-β-phenylethyl)-3-methyl-5-aminopyrazole in 300 parts of glacial acetic acid and 500 parts of water.

The acid reaction of the reaction mixture is buffered by the addition of sodium acetate until Congo red paper is only slightly turned blue whereupon the whole is stirred for 2 hours at room temperature.

The dyestuff formed is filtered off under suction, washed with dilute sodium carbonate solution until the washing water is neutral and dried at 60°. It precipitates in the form of a yellow-orange powder which, when milled with sodium dodecyl benzene sulphonate, dyes terephthalic acid polyester fibres from aqueous dispersion, possibly in the presence of a swelling agent such as o-phenylphenol, in yellow-orange shades. The dyeings have excellent fastness to light and migration.

*Example 8*

20.7 parts of 1-amino-2,6-dichloro-4-nitrobenzene are dissolved in 40 parts of concentrated sulphuric acid and nitrosyl sulphuric acid, corresponding to 6.9 parts of sodium nitrite, is added. Diazotisation is performed, with stirring, for 1½ hours at 20–25°. The solution of the diazonium compound, after possible clarification, is poured, while stirring, into a cooled solution of 21.7 parts of 1 -(β - hydroxy - β - phenylethyl)-3-methyl-5-aminopyrazole in dilute hydrochloric acid and the pH of the reaction mass is adjusted to 4–4.5 by the addition of sodium acetate. The precipitated dyestuff is filtered off, washed neutral with dilute sodium carbonate solution and with water and dried at 60°. In this way an orange powder is obtained which is milled with fatty alcohol sulphonate. It dyes polyester fibres from aqueous dispersion in vivid orange shades. The dyeings are distinguished by good fastness properties.

We claim:
1. A monoazo dyestuff of the formula

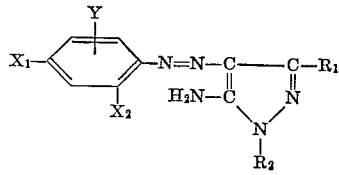

wherein:
of $X_1$ and $X_2$, one X stands for the nitro group and the other for an electrophilic substituent selected from the group consisting of
nitro, cyano, chloro, bromo, benzoyl, carboethoxy, lower alkyl-sulfonyl with lower alkyl of 1 to 4 carbon atoms, phenylsulfonyl, toluylsulfonyl, chlorophenylsulfonyl, mono- and di-lower alkyl-sulfamido, cyclohexylsulfamido, N-phenyl-N-methyl-sulfamido, N - phenyl-N-ethyl-sulfamido, N-hydroxyethyl-sulfamido, N-methyl-N-hydroxyethyl-sulfamido;

Y is a member selected from the group consisting of hydrogen, chlorine, bromine and methyl;

$R_1$ is a member selected from the group consisting of lower alkyl with 1 to 3 carbon atoms and phenyl, and $R_2$ is a member selected from the group consisting of hydrogen, lower alkyl, hydroxy-lower alkyl, cyano-lower alkyl, cycloalkyl with 6 to 7 carbon atoms, phenyl-lower alkyl, phenyl-lower hydroalkyl, phenyl, methylphenyl, lower alkoxyphenyl, chlorophenyl, phenoxyphenyl, anilino, lower alkyl-sulfonyl-phenyl, -phenyl-SO₂—NH₂, -phenyl-SO₂—NH-lower alkyl, -phenyl-SO₂—NH-(hydroxy-lower alkyl),

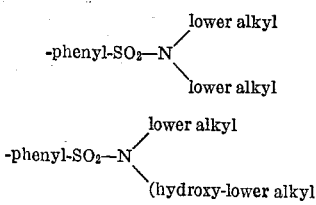

and

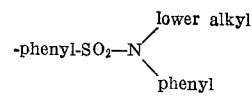

2. The monoazo dyestuff of the formula

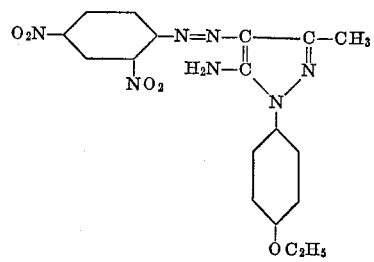

3. The monoazo dyestuff of the formula

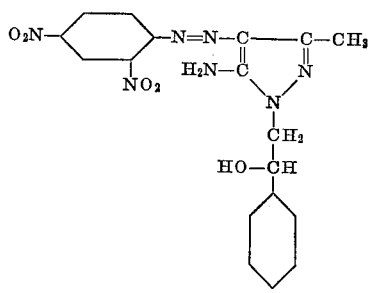

4. The monoazo dyestuff of the formula

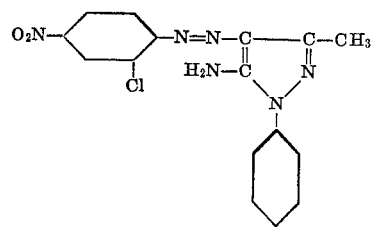

5. The monoazo dyestuff of the formula
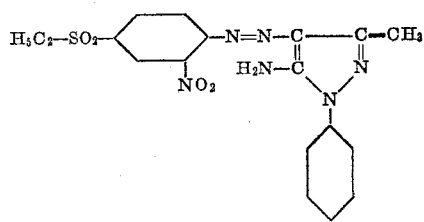
6. The monoazo dyestuff of the formula
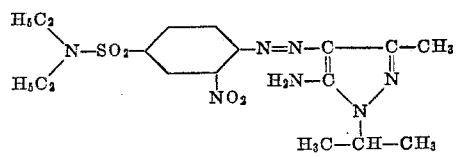
7. The monoazo dyestuff of the formula
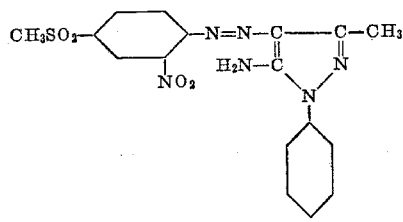
References Cited
UNITED STATES PATENTS
2,728,762   12/1955   Heyna et al. _____ 260—163
3,012,843   12/1961   Gang-meux et al. __ 260—163 X
3,144,437   8/1964    Uehlinger _____ 260—162 X
CHARLES B. PARKER, *Primary Examiner.*
D. M. PAPUGA, *Assistant Examiner.*